United States Patent [19]

Felder

[11] 4,169,983

[45] Oct. 2, 1979

[54] MULTI-ROTOR, DIRECT CURRENT ELECTRIC MOTOR

[76] Inventor: Donald W. Felder, 1153-A Drennan Park, Fort Campbell, Ky. 42223

[21] Appl. No.: 917,547

[22] Filed: Jun. 21, 1978

Related U.S. Application Data

[63] Continuation-in-part of Ser. No. 725,628, Sep. 22, 1976, abandoned.

[51] Int. Cl.² ............................................. H02K 37/00
[52] U.S. Cl. ...................................... 310/46; 310/114; 310/103
[58] Field of Search ................. 310/46, 112, 114, 126, 310/103, 83

[56] References Cited

U.S. PATENT DOCUMENTS

| | | | |
|---|---|---|---|
| Re. 29,165 | 3/1977 | Bode | 310/46 |
| 1,863,294 | 6/1932 | Bogia | 310/46 |
| 2,279,690 | 4/1942 | Lindsey | 310/46 |
| 3,168,665 | 2/1965 | Holper | 310/112 |
| 3,757,149 | 9/1973 | Holper | 310/114 |

*Primary Examiner*—Donovan F. Duggan
*Attorney, Agent, or Firm*—Harrington A. Lackey

[57] ABSTRACT

A pair of proximally spaced parallel rotors, the proximal area between the rotors defining a center position containing a center line extending through both rotary axes of the rotors, a plurality of circumferentially spaced magnets of alternating polarity around each rotor and a shielded electromagnet having a pole tip in the center position intercepting the center line, and means for alternating the polarity of the electromagnet as each pair of opposed magnets of like polarity on opposite rotors move through the center position, in order to magnetically draw the magnets approaching the center position and repel the magnets leaving the center position.

4 Claims, 6 Drawing Figures

MULTI-ROTOR, DIRECT CURRENT ELECTRIC MOTOR

CROSS REFERENCE TO RELATED APPLICATION

This application is a continuation-in-part of application Ser. No. 725,628, filed Sept. 22, 1976, now abandoned for MULTI-ROTOR DIRECT CURRENT ELECTRIC MOTOR.

BRIEF SUMMARY OF THE INVENTION

This invention relates to a multi-rotor, direct current, electric motor in which two or more cylinder-shaped rotors with channel horseshoe-shaped magnets, poles positioned outward and alternating, are evenly spaced around the circumference of the respective motors. The rotation of the rotors is timed and phased by gears. A channel horseshoe-shaped electromagnet, timed by a segmental slip ring on the shaft of one rotor, is placed partially between the pairs of rotors in a center position to act as a magnetic shield between the advancing like poles of magnets on opposing rotors and to attract the advancing magnets to their point of greatest attraction. At this point, the polarity of the electromagnet is reversed by the timing of the slip ring, to repel the passing rotor magnets while attracting the trailing rotor magnets of alternate polarity. The top pole of the horseshoe-shaped electromagnet attracts and repels the top poles of both rotors, while the bottom pole of the electromagnet attracts and repels the bottom pole of both rotors. As the poles of the magnets are repelled past the tips of the electromagnet protrusions, additional energy is gained by the opposing like poles having passed the center position so that their repulsion of each other causes further rotation.

DETAILED DESCRIPTION

Figure 1:
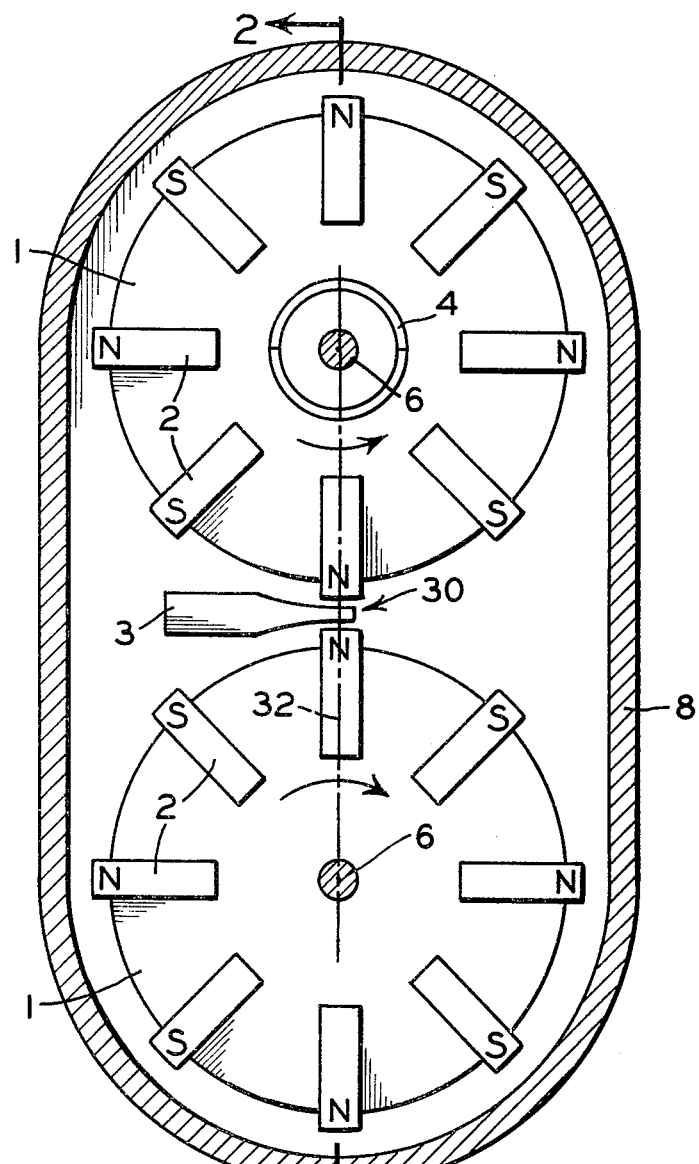
FIG. 1 is a view from the top of a multi-rotor direct current electric motor with two rotors, with the top rotor housing plate removed.
Figure 2:
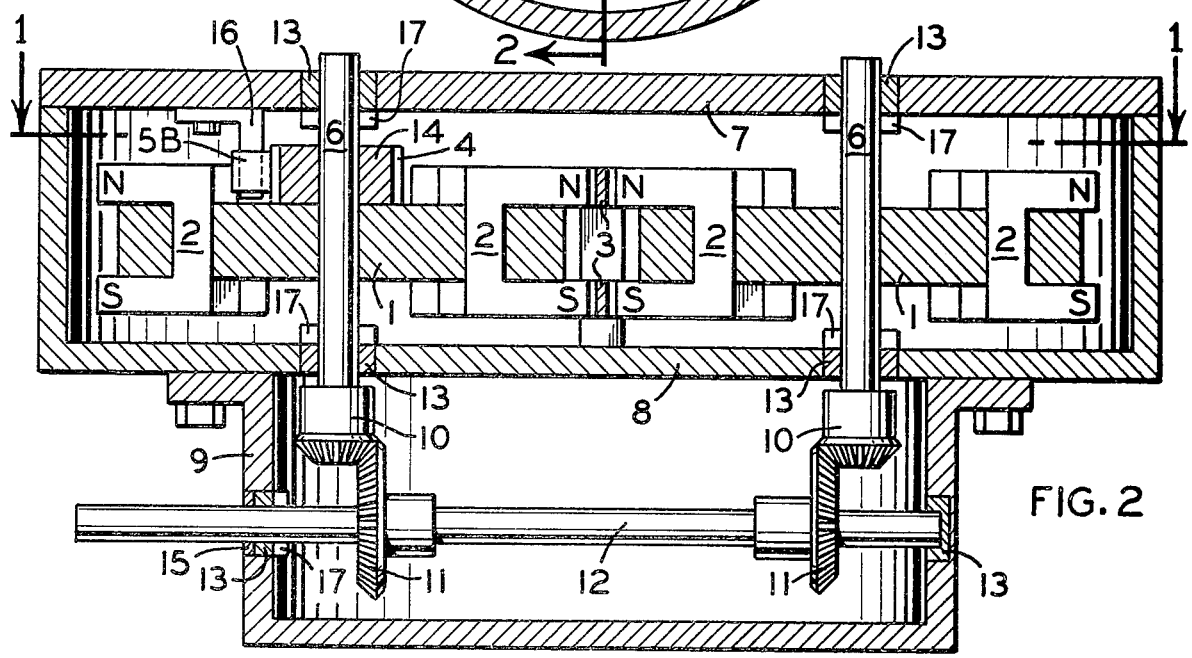
FIG. 2 is a reduced section taken along the line 2—2 of FIG. 1, and rotated 90°.

In the drawings, FIG. 1 shows a multi-rotor direct current electric motor with two cylindrical rotors 1, parallel and opposed, each with eight channel horseshoe-shaped magnets 2 equally spaced around the circumference with the north and south poles pointing outward and alternating. The rotor 1 at the upper portion of FIG. 1 has a segmental slip ring 4 attached to the same shaft 6, and rotates counter-clockwise, while the opposing rotor 1 rotates clockwise. The rotors 1 are indirectly geared together with a one-to-one ratio, as shown in FIG. 2.

The electromagnet 3 located in the center position 30 between the rotors 1 will attract the advancing magnets 2 and repel the passing magnets 2 simultaneously, when the polarity of the electromagnet 3 is properly timed and phased by the slip ring 4. FIG. 2 shows the protrusions of the electromagnet 3 parallel to the opposing like poles of the magnets 2 of the opposing rotors 1 so that the pole at the top of the electromagnet 3 can attract and repel the top poles of the magnets 2, while the opposite pole at the bottom of the electromagnet 3 attracts and repels the opposite poles of the magnets 2 at the bottom until they have passed the center position 30.

Figure 3:
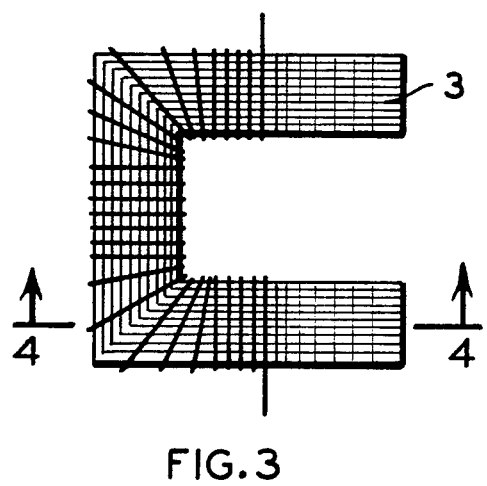
FIG. 3 is a view of the electromagnet laid on its side showing the laminations.
Figure 4:
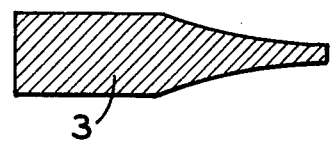
FIG. 4 is a section taken along the line 4—4 of FIG. 3 of an electromagnet showing the arc of the cuts of its semi-wedge shaped protrusions.

The electromagnet 3 shields the advancing magnets 2 from the opposing magnets 2 of the opposing rotor 1 until the magnets 2 have passed the center position 30, and more specifically the center line 32 intersecting the rotary axes of both rotor shafts 6, where the magnets 2 are in the closest proximity to each other. After the opposing magnets 2 pass the center line 32, they repel each other as well as the electromagnet 3 causing further rotation of the rotors 1. The electromagnet 3 has a laminated core of channel horseshoe shape with the laminations insulated and stacked from top to bottom as can be seen in FIG. 3. FIG. 4 shows a protrusion of the electromagnet 3 core being semi-wedge shaped, cut on the approximate arcs of the rotors 1 for approximately three-fourths of their length with the thinnest portion of each protrusion being approximately at its tip, to allow the rotors 1 to rotate in close proximity to the electromagnet 3 and to each other.

The rotors 1 are rigidly fixed to their shafts 6, which are journaled in bearings 13 in the top rotor housing plate 7 and in the bottom rotor housing plate 8, with the shafts 6 held in position vertically by shaft clamps 17. In FIG. 2, the gear housing 9, which also serves as a gear oil reservoir, contains the right-angle driven gears 11 and the right-angle driving gears 10 fixed on the bottom end of each rotor shaft 6. The driven gears 11 are mounted on the output shaft 12 and mesh with the driving gears 10 so that the rotors 1 are indirectly geared to each other and the torque from both rotors 1 is transmitted to the common output shaft 12. The output shaft 12 is horizontal in vertical alignment with the centers of the rotors 1 and mounted in bearings 13, with an oil seal 15 where the shaft 12 passes from the gear housing 9. The output shaft 12 is held in position by shaft clamps 17.

Figure 5:
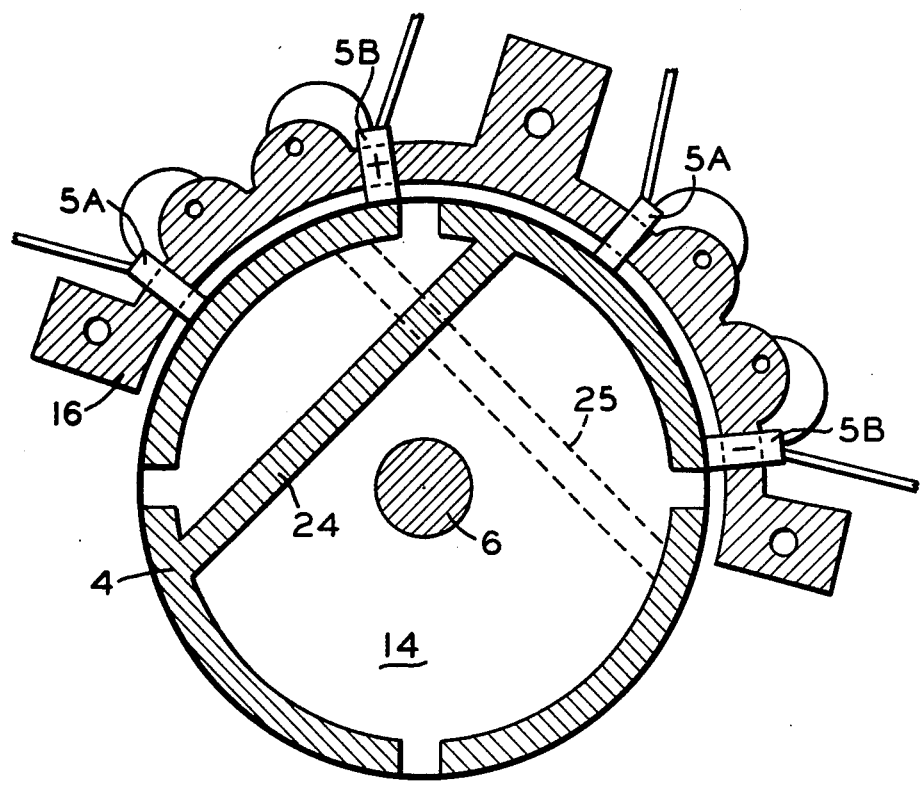
FIG. 5 is an enlarged sectional view of the segmental slip ring, indicating the connection of the segments to the opposite segments, the separation of the segments and the position of the brushes in the brush holder relative to the slip ring.

The segmental slip ring 4, as shown in FIG. 5, has four electrical conducting segments of equal size evenly spaced around the outer circumference, with each segment being electrically connected by a conductor 24, 25 to the diametrically opposed segment, with sufficient separation of the segments that the brushes 5A and 5B at the outer circumference of the slip ring 4 will each contact only one segment at a time. The electrical conductors 24 and 25 between the opposite segments are disposed at opposite ends of the slip ring 4 to insulate the conductors 24 and 25 from each other. The conducting segments and the cross conductors 24 and 25 of the slip ring 4 are electrically insulated from each other and the rotor shaft 6 by the non-conducting slip ring core 14.

Four brushes, 5A and 5B as shown in FIG. 5, are held by a brush holder 16 of non-conducting material attached to the top rotor housing plate 7 (FIG. 2). The brushes 5A and 5B are at 45° intervals around approximately a 135°-portion of the circumference of the slip ring 4, with the brushes 5B connected to the power source being approximately 90° apart and the brushes 5A connected to the electromagnet 3 leads also being approximately 90° apart, so that the poles of the electromagnet 3 will be reversed after each 45° of rotation. The electromagnet 3 is timed and phased so that the advancing poles of the magnets 2 are attracted and receding poles of the magnets 2 are repelled, the top magnet 2 poles by the top pole of the electromagnet 3 and the bottom magnet 2 poles by the bottom pole of the electromagnet 3. When the magnet 2 poles rotate to the point of greatest attraction on center line 32, new segments of the slip ring 4 are rotated into contact with brushes 5A and 5B to reverse the flow of electricity to the electromagnet 3, thereby reversing its polarity. The magnet 2 at its point of greatest attraction on center line 32 is now repelled in the direction of rotation, while the next trailing magnet 2 is attracted toward the point of greatest attraction, thus perpetuating the rotation of the respective rotors 1.

Figure 6:
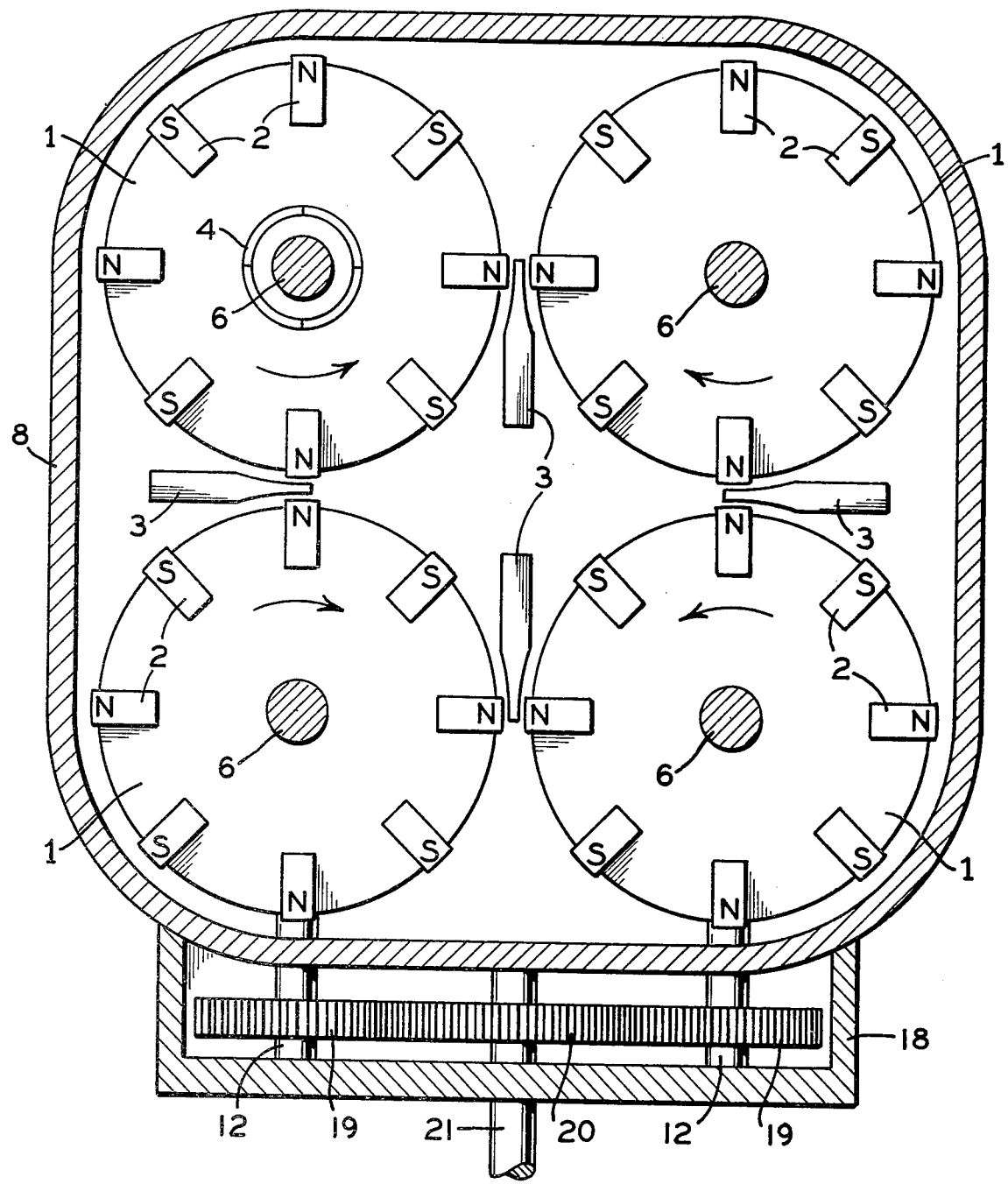
FIG. 6 is a sectional plan view of an alternative multi-rotor DC electric motor with four rotors, indicating the position of the four electromagnets and the one slip ring.

In FIG. 6, a four-rotor DC electric motor is shown using the same operating principles as the two-rotor version previously described, to indicate the feasability of using more than two rotors 1 when greater torque requirements exist. By doubling the number of rotors 1 to four and increasing the electromagnets 3 to four, which can be connected either in series or in parallel and operated off the one slip ring 4, approximately four times the torque can be extracted. With large numbers of rotors 1, the ratio is even more favorable, although the ratio of electric energy used to torque output will remain approximately the same. The gearing for the four-rotor is the same, except that a mixing gear box 18, as shown in FIG. 6, is added. An output gear 19 on each of the output shafts 12, as shown in FIG. 2, meshes with a mixing gear 20 on an output shaft 21 which times and phases the two halves of the motor together.

Although the multi-rotor DC electric motor is designed primarily for automotive use, where size and shape are not as critical, but electrical energy requirements are in order to be competitive, it is to be appreciated that the motor is not restricted to such use.

What is claimed is:

1. A multi-rotor, direct current, electric motor comprising:
   (a) a pair of proximal spaced rotors mounted for rotation about parallel rotary axes, the area between the closest spaced, opposed, circumferential surfaces of said rotors defining a center position containing a straight center line perpendicular to both rotary axes,
   (b) a plurality of radially disposed permanent magnets uniformly circumferentially spaced around the perimeter of each of said rotors,
   (c) said magnets on each rotor having outer poles of circumferentially alternating polarity,
   (d) means confining said rotors to rotary movement in opposite directions from each other so that poles of like polarity on opposite rotors oppose each other in said center position,
   (e) an electromagnet having a pole tip in said center position and intercepting said center line, and having magnetic shielding means projecting from said pole tip between the poles on opposite rotors trailing said center line,
   (f) means responsive to the rotation of said rotors energizing said electromagnet to alternately reverse the polarity of said pole tip as each pair of opposed poles moves past said center position to change said pole tip from a polarity opposite the polarity of said opposed poles to the same polarity as said opposed poles, and
   (g) said circumferential spacing between adjacent poles on each rotor being close enough that the pole next trailing said center line is attracted by said pole tip while the pole moving past said center line is repelled in the rotary direction of said respective rotor.

2. The invention according to claim 1 in which at least eight of said radially disposed permanent magnets are spaced around the perimeter of each of said rotors.

3. The invention according to claim 1 in which each of said permanent magnets comprises a horseshoe magnet having a pair of uniformly, axially, spaced poles of opposite polarity, said electromagnet having a horseshoe shape and a pair of axially spaced pole tips of substantially the same axial spacing as the outer poles of said permanent magnets.

4. The invention according to claim 1 in which said means energizing said electromagnet comprises electrical rotary communicator means having rotary contact elements mounted for rotation about the rotary axis of one of said rotors, and means for electrically connecting said commutator means to said electromagnet.

* * * * *